Patented Apr. 6, 1926.

1,579,302

UNITED STATES PATENT OFFICE.

WILLIAM THOMAS GIDDEN, OF SMETHWICK, AND WILLIAM GILBERT RAGG, OF BIRMINGHAM, ENGLAND, ASSIGNORS TO CHANCE AND HUNT, LIMITED, OF OLDBURY, ENGLAND.

PROCESS FOR TREATING CRUDE OXIDE AND CARBONATE OF ZINC.

No Drawing.     Application filed November 28, 1923. Serial No. 677,521.

*To all whom it may concern:*

Be it known that we, WILLIAM THOMAS GIDDEN, a subject of the King of Great Britain, residing at Abbey Road, Smethwick, Staffordshire, England, and WILLIAM GILBERT RAGG, a subject of the King of Great Britain, residing at Lordswood Road, Harborne, Birmingham, England, have invented new and useful Improved Processes for Treating Crude Oxide and Carbonate of Zinc, of which the following is a specification.

This invention relates to a process for treating crude carbonate or oxide of zinc.

The essential novel features of the invention whereby a product consisting of zinc oxide of the high grade and physical condition demanded by the present market are:

1. The separation of the dissolved zinc from its ammoniacal solution by a combination of a sudden dilution with water and subsequent distillation of the ammonia. It has been found that a mere distillation of the ammonia yields a product of dense physical condition and low value, whereby precipitation of the zinc by sudden dilution following by distillation of the ammonia to complete the separation gives a voluminous product of the most approved physical condition and color.

2. The process for the elimination of manganese which if not removed is prejudicial to the appearance and value of the final product.

3. The use of activated zinc to remove cobalt which if not separated gives a green color to the final product.

4. The addition at some stage prior to the distillation of alkali or alkali carbonate to prevent contamination of the product with sulphate, a soluble sulphate thus being produced and removed in the solution.

According to this invention, crude carbonate or oxide of zinc is dissolved in a solution of ammonia or ammonium carbonate, the solution separated from the undissolved matter and the zinc content of the solution recovered either by diluting the solution or by distilling off the ammonia or by a combination of the two methods.

As zinc oxide is not appreciably soluble in a solution of pure ammonia but only in ammoniacal solutions of salts of ammonia, ammonium carbonate is normally the solvent selected when the crude zinc oxide does not in itself contain a sufficiency of, for example, sulphate or carbonate for the zinc oxide to dissolve sufficiently completely on the addition of a solution of ammonia.

Before precipitating the zinc content of the solution so obtained, it is in general necessary to subject the solution to further treatment; the dissolving process will usually, however, have eliminated most of the impurities, in particular all the gangue and siliceous matter, practically all the iron compounds and much of the manganese content.

Thus, crude oxides of zinc normally contain sulphates which can be removed if at any stage prior to, or during, the distillation of the solution for the recovery of the ammonia and the zinc content, there is added thereto an alkali metal carbonate or hydroxide in slight excess of the chemical equivalent of the sulphate, the sulphate thus being rendered soluble and removed in the solution.

The metallic impurities which come into solution with the zinc oxide and carbonate are most frequently lead, copper, cadmium, cobalt and manganese, especially when the raw material is derived from roasted natural sulphides of zinc ores or concentrates for which this process is particularly applicable.

The manganese present is advantageously eliminated by treating the solution with air to produce the oxide or hydrated oxide of manganese, and this treatment may be carried out either before or subsequent to the elimination of metals such as lead, copper and cadmium.

Particularly when the solution has a cobalt content the lead, copper, cadmium and cobalt impurities are eliminated by treating the solution with zinc or zinc dust; it should be noted, however, that in the absence of metallic salts of such metals as lead or copper, it is necessary for precipitating cobalt by these means, to moisten the zinc or zinc dust with a solution of a salt of these metals or of course to add a solution of a salt of one or both these metals to the solution to be purified from cobalt. This renders the zinc an active precipitating agent as regards the cobalt contained in the solution.

Alternative methods of precipitating lead, copper and cadmium impurities are to precipitate them by the addition of a soluble sulphide, such as ammonium sulphide or a limited amount of hydrogen sulphide, or some precipitated sulphide of zinc.

The invention is illustrated in the accompanying examples, and as regards those in which calcined zinc blende is the raw material, it is to be noted that zinc in the form of ferrite is not soluble in the ammoniacal solutions used; in the examples in question, in fact, only about 70% of the zinc oxide content was free to dissolve.

Example 1.

224 lbs. of well calcined zinc blende concentrates, containing 52.8% total zinc and 2.2% sulphur were treated by agitation with 55 gallons of solution of ammonium carbonate testing $NH_3$ 1.5 and $CO_2$ 1.0 lbs. per gallon.

After filtration the solid residue was again agitated with a similar quantity of ammonium carbonate solution, and this, when separated, was used for treatment of a second batch of 224 lbs. of calcined zinc concentrates, and so on.

By working in this manner both saturation of the liquor with zinc and complete extraction of soluble zinc from the ore was obtained.

Each batch of 224 lbs. of ore thus gave approximately 55 gallons of liquor containing 1.8 lbs. zinc oxide per gallon, a little water being used as final wash for each batch of ore.

Through 55 gallons of this liquor air was blown in a fine stream for four hours, and the liquor was then filtered from the traces of manganese separated.

To the filtered liquor, which still contained as impurities copper .0033, lead .0009, cadmium .0015 lbs. per gallon, was added ½ gallon of solution of ammonium sulphide containing 15% sulphide sulphur, and also 15 lbs. of soda ash.

After well stirring, the liquor was filtered through a closed filter, and so purified was placed in the upper of two connected stills and there heated by in-blown steam until a test sample showed that precipitation of zinc was imminent.

The liquor was then run into the lower still, already containing 55 gallons of boiling water, and distillation was carried on until the removal of the ammonia was substantially complete.

The ammonia was condensed and collected as a liquor containing approximately 1.7 lbs. $NH_3$ and 0.7 lbs. $CO_2$ per gallon which by further treatment with lime-kiln gas was brought approximately to the composition of 1.5 lbs. $NH_3$ and 1.0 lbs. $CO_2$ per gallon, ready for use as fresh solvent.

The still contents were run off on to a filter, drained and washed with water, and the solid product dried and ignited in a muffle furnace at a temperature sufficient to remove all carbon dioxide.

The product obtained weighed 99 lbs. and tested 99.7% oxide of zinc, and was free from lead, manganese, copper and cadmium.

Example 2.

A quantity of liquor containing dissolved zinc oxide prepared as in Example 1, and similarly freed from manganese was purified as follows:—

To 50 gallons of the liquor, containing as impurities copper .0033, cadmium .0015, lead .0009, cobalt .0001 lbs. per gallon, was added 3 lbs. of zinc dust and 15 lbs. soda ash, and after well stirring for 1½ hours, the whole was filtered through a closed filter (this is necessary as the precipitated impurities become quickly oxidized and again tend to become dissolved), and the filtered liquor treated as in the foregoing example.

The product was then an oxide free from manganese, lead, copper, cadmium and cobalt, and testing 99.7% oxide of zinc.

Example 3.

With as raw material a crude zinc oxide made by a precipitation process and testing 88.5% zinc oxide and 4% $SO_3$, and free from manganese, 224 lbs. were stirred with 100 gallons of the ammonium carbonate solution, and the whole filtered to remove the undissolved matter.

To the filtered liquor was added 1 gallon of the ammonium sulphide solution, and after well stirring the liquor was again filtered.

To 50 gallons of the filtered liquor, there was added 10 lbs. of soda ash, and distillation and finishing were conducted as in the foregoing examples.

The final product weighed 98 lbs. and tested 99.8% oxide of zinc.

What we claim is:—

1. A process for producing zinc oxide of a high degree of purity from crude material containing an oxygen compound of zinc which comprises forming a solution containing the crude material and ammonium carbonate, and recovering the zinc content of the solution by sudden dilution with water followed by distillation of the ammonia.

2. A process for producing zinc oxide of a high degree of purity from crude material containing an oxygen compound of zinc which comprises forming a solution containing the crude material and ammonium carbonate, separating the solution from the undissolved material and recovering the zinc content of the solution by sudden dilution with water followed by distillation of the ammonia.

3. A process for producing zinc oxide of a high degree of purity from crude material containing an oxygen compound of zinc which comprises forming a solution containing the crude material and ammonium carbonate and recovering the zinc content of the solution by distilling off a portion of the ammonia, then suddenly diluting the solution and then distilling off the remainder of the ammonia.

4. A process for producing zinc oxide of a high degree of purity from crude material containing an oxygen compound of zinc which comprises forming a solution containing the crude material and ammonium carbonate, adding an alkali metal carbonate to the solution, suddenly diluting the solution and then distilling off the ammonia to recover the zinc content of the solution.

5. A process for producing zinc oxide of a high degree of purity from crude material containing an oxygen compound of zinc which comprises forming a solution containing the crude material and ammonium carbonate, adding to the solution zinc which has been wetted with a solution of a salt of a metal selected from a group comprising copper and lead which is adapted to increase the efficiency of zinc as an active precipitating agent as regards the cobalt contained in the solution and recovering the zinc content of the solution by suddenly diluting the solution and distilling off the ammonia.

6. A process for producing zinc oxide of a high degree of purity from crude material containing an oxygen compound of zinc which comprises forming a solution containing the crude material and ammonium carbonate, treating the solution with air to eliminate the manganese content of the solution, and recovering the zinc content of the solution by suddenly diluting the solution and then distilling off the ammonia.

7. A process for producing zinc oxide of a high degree of purity which comprises treating a zinciferous material with a solution of ammonium carbonate, filtering the solution, treating the filtered solution to precipitate the contaminating metallic content thereof, filtering the treated solution, blowing steam into the filtered solution, running it into water, and then distilling off the ammonia.

8. A process for producing zinc oxide of a high degree of purity which comprises treating a zinciferous material with a solution of ammonium carbonate, filtering the solution, treating the filtered solution with air to recover the manganese content thereof, precipitating the remaining contaminating metallic content of the solution, again filtering the solution, suddenly diluting the solution and distilling off the ammonia.

9. A process for producing zinc oxide of a high degree of purity which comprises treating a zinciferous material with a solution of ammonium carbonate, filtering the solution, treating the solution to precipitate the contaminating metallic content thereof, adding an alkali, blowing steam into the solution, running the solution into water, and distilling off the ammonia.

In testimony that we claim the foregoing as our invention we have signed our names this ninth day of November, 1923.

WILLIAM THOMAS GIDDEN.
WILLIAM GILBERT RAGG.